United States Patent
Chakkaravarthi

(10) Patent No.: US 10,514,902 B2
(45) Date of Patent: Dec. 24, 2019

(54) METHOD AND SYSTEM FOR UPDATING A SOFTWARE PROGRAM INSTALLED IN AN ELECTRONIC DEVICE

(71) Applicant: TP Vision Holding B.V., Amsterdam (NL)

(72) Inventor: S S Chakkaravarthi, Karnataka (IN)

(73) Assignee: TP VISION HOLDING B.V., Amsterdam (NL)

( * ) Notice: Subject to any disclaimer, the term of this patent is extended or adjusted under 35 U.S.C. 154(b) by 49 days.

(21) Appl. No.: 15/888,423

(22) Filed: Feb. 5, 2018

(65) Prior Publication Data

US 2019/0227782 A1    Jul. 25, 2019

(30) Foreign Application Priority Data

Jan. 22, 2018  (EP) ..................... 18152740

(51) Int. Cl.
| | |
|---|---|
| *H04L 29/08* | (2006.01) |
| *H04W 4/00* | (2018.01) |
| *H04L 29/06* | (2006.01) |
| *G06F 1/26* | (2006.01) |
| *G06F 8/65* | (2018.01) |

(Continued)

(52) U.S. Cl.
CPC ............. *G06F 8/65* (2013.01); *G06K 7/1413* (2013.01); *H04L 67/34* (2013.01); *H04W 4/80* (2018.02); *H04W 76/10* (2018.02); *H04W 84/12* (2013.01)

(58) Field of Classification Search
CPC .......... G06F 8/20–78; G06F 8/61; G06F 8/65; G06F 8/60; G06F 8/71; G06F 9/44; H04W 4/80; H04L 67/02; H04L 67/12; H04L 67/34; H04L 67/10
See application file for complete search history.

(56) References Cited

U.S. PATENT DOCUMENTS 8,606,892 B2 * 12/2013 Mallur ...................... G06F 8/65
                                                  709/221
9,294,869 B2 *  3/2016 Pang ..................... H04W 76/14
(Continued)

FOREIGN PATENT DOCUMENTS

| CN | 106210898 A | 12/2016 |
|---|---|---|
| WO | 2017/023267 A1 | 2/2017 |

OTHER PUBLICATIONS

Rao et al., A Methodological Review Based Version Control System with Evolutionary Research for Software Processes, 6 pages (Year: 2016).*

(Continued)

*Primary Examiner* — Thuy Dao

(74) *Attorney, Agent, or Firm* — Hamre, Schumann, Mueller & Larson, P.C.

(57) ABSTRACT

A method for updating a software program installed in a target electronic device includes: displaying a barcode that encodes device information; by a mobile electronic device, scanning the barcode and decoding the barcode to obtain the device information; communicating, by the mobile electronic device, with an update server to download update data; by the mobile electronic device, transmitting the update data to the target electronic device through wireless communication; and updating, by the target electronic device, the software program installed therein to a new version using the received update data.

13 Claims, 3 Drawing Sheets

(51) Int. Cl.
*G06K 7/14* (2006.01)
*H04W 4/80* (2018.01)
*H04W 76/10* (2018.01)
*H04W 84/12* (2009.01)

(56) References Cited

U.S. PATENT DOCUMENTS

| | | | | |
|---|---|---|---|---|
| 9,380,613 B2* | 6/2016 | Luna | ................... | H04W 76/10 |
| 9,495,145 B1* | 11/2016 | Brech | ...................... | G06F 8/65 |
| 9,772,193 B1* | 9/2017 | Mendelson | ............ | H04W 4/90 |
| 9,961,507 B1* | 5/2018 | Mendelson | ............ | H04W 4/90 |
| 10,169,626 B2* | 1/2019 | Britt | ................. | G06K 7/10386 |
| 2016/0378455 A1* | 12/2016 | Lochan | .................... | G06F 8/65 |
| | | | | 717/169 |
| 2017/0171607 A1* | 6/2017 | Britt | ................ | H04N 21/43615 |
| 2018/0176272 A1* | 6/2018 | Zur | .................... | C07D 487/22 |

OTHER PUBLICATIONS

The Search Report issued to European counterpart application No. 18152740.9 by the EPO dated Jun. 26, 2018.

* cited by examiner

METHOD AND SYSTEM FOR UPDATING A SOFTWARE PROGRAM INSTALLED IN AN ELECTRONIC DEVICE

CROSS-REFERENCE TO RELATED APPLICATION

This application claims priority of European Patent Application No. 18152740.9, filed on Jan. 22, 2018.

FIELD

The disclosure relates to a method and a system for updating a software program installed in an electronic device, particularly for updating a software program installed in an electronic device that is not connected to the Internet.

BACKGROUND

As the technique related to the Internet of things (IoT) progresses, more and more home appliances and devices may be connected to the Internet, allowing data transmission and easier remote control by a user using a portable device such as a smart phone. For example, a television (TV) set with Internet connectivity (i.e., an Internet-enabled TV set) may be connected to the Internet so as to provide additional functionalities and contents that are not originally provided by a traditional TV set. The TV set may be provided with an operating system (OS) or a software application enabling the TV set to operate as a smart TV.

When the OS or the software application installed in the TV set needs to be updated, the TV set, if connected to the Internet, may download an update file directly through the Internet. However, in the case that the Internet access is not available for the TV set, or for a traditional TV set, the update of the OS/software application may be done using other means, such as by preparing a data storage (e.g., a universal serial bus (USB) flash drive) storing the update file and connecting the data storage to the TV set for transmitting the update file thereto. In some cases, the data storage may be provided by a manufacturer of the TV set.

SUMMARY

One object of the disclosure is to provide a method for updating a software program installed in an electronic device that may not be connected to the Internet.

According to one embodiment of the disclosure, the method is for updating a software program installed in a target electronic device using a mobile electronic device. The method includes:
  displaying, by the target electronic device, a barcode that encodes device information associated with the target electronic device, the device information including at least a version number of the software program installed in the target electronic device;
  scanning, by the mobile electronic device, the barcode displayed on the target electronic device;
  decoding, by the mobile electronic device, the barcode so as to obtain the device information encoded in the barcode;
  communicating, by the mobile electronic device, with an update server so as to determine, according to the version number of the software program, whether update data for a new version of the software program is available in the update server;
  when it is determined that the update data is available, downloading, by the mobile electronic device, the update data from the update server;
  establishing, by the mobile electronic device, wireless communication with the target electronic device for data transmission;
  transmitting, by the mobile electronic device, the update data to the target electronic device through the wireless communication; and
  updating, by the target electronic device, the software program installed therein to the new version using the update data received from the mobile electronic device.

Another object of the disclosure is to provide an electronic system for performing the above-mentioned method.

According to one embodiment of the disclosure, the electronic system includes a target electronic device and a mobile electronic device.

The target electronic device is installed with a software program, and includes a display, a device wireless communication component, and a device processor electrically connected to the display and the device wireless communication component. The device processor is programmed to control the display to display a barcode that encodes device information associated with the target electronic device, the device information including at least a version number of the software program.

The mobile electronic device includes an image capturing component for scanning the barcode displayed on the display of the target electronic device, a mobile wireless communication component capable of communicating with the device wireless communication component for data transmission, a networking component capable of communicating with an update server through the Internet, and a mobile processor. The mobile processor is programmed to:
  decode the barcode scanned by the image capturing component so as to obtain the device information encoded in the barcode;
  control the networking component to communicate with the update server so as to determine, according to the version number of the software program, whether update data for a new version of the software program is available in the update server;
  when it is determined that the update data is available, download the update data from the update server through the networking component;
  control the mobile wireless communication component to establish wireless communication with the device wireless communication component of the target electronic device; and
  transmit the update data to the target electronic device through the wireless communication so as to enable the device processor to update the software program to the new version using the update data received from the mobile electronic device.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1A:
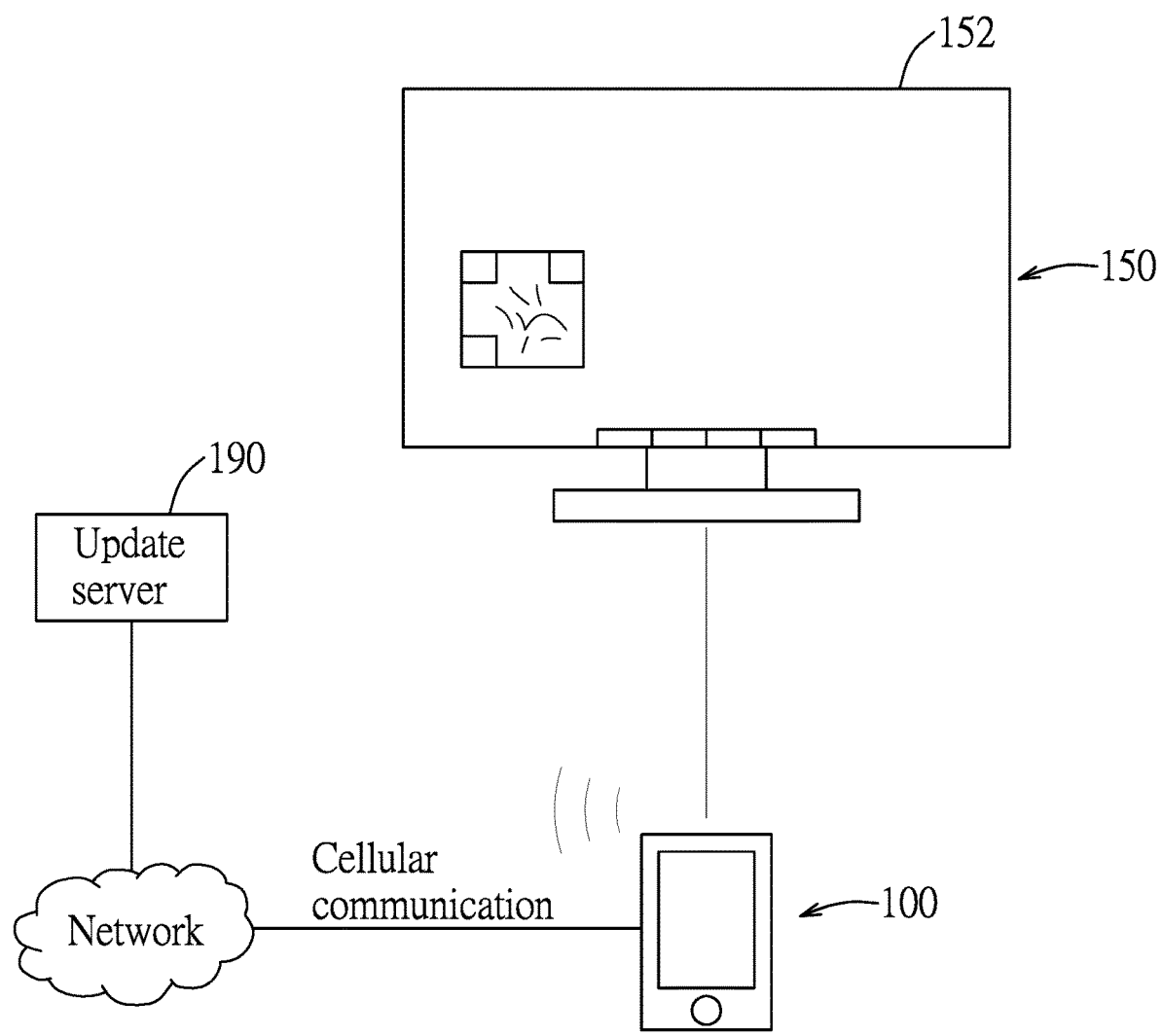
FIG. 1A illustrates an electronic system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1A illustrates an electronic system according to one embodiment of the disclosure. The electronic system includes a mobile electronic device 100 and a target electronic device 150.

Figure 1B:
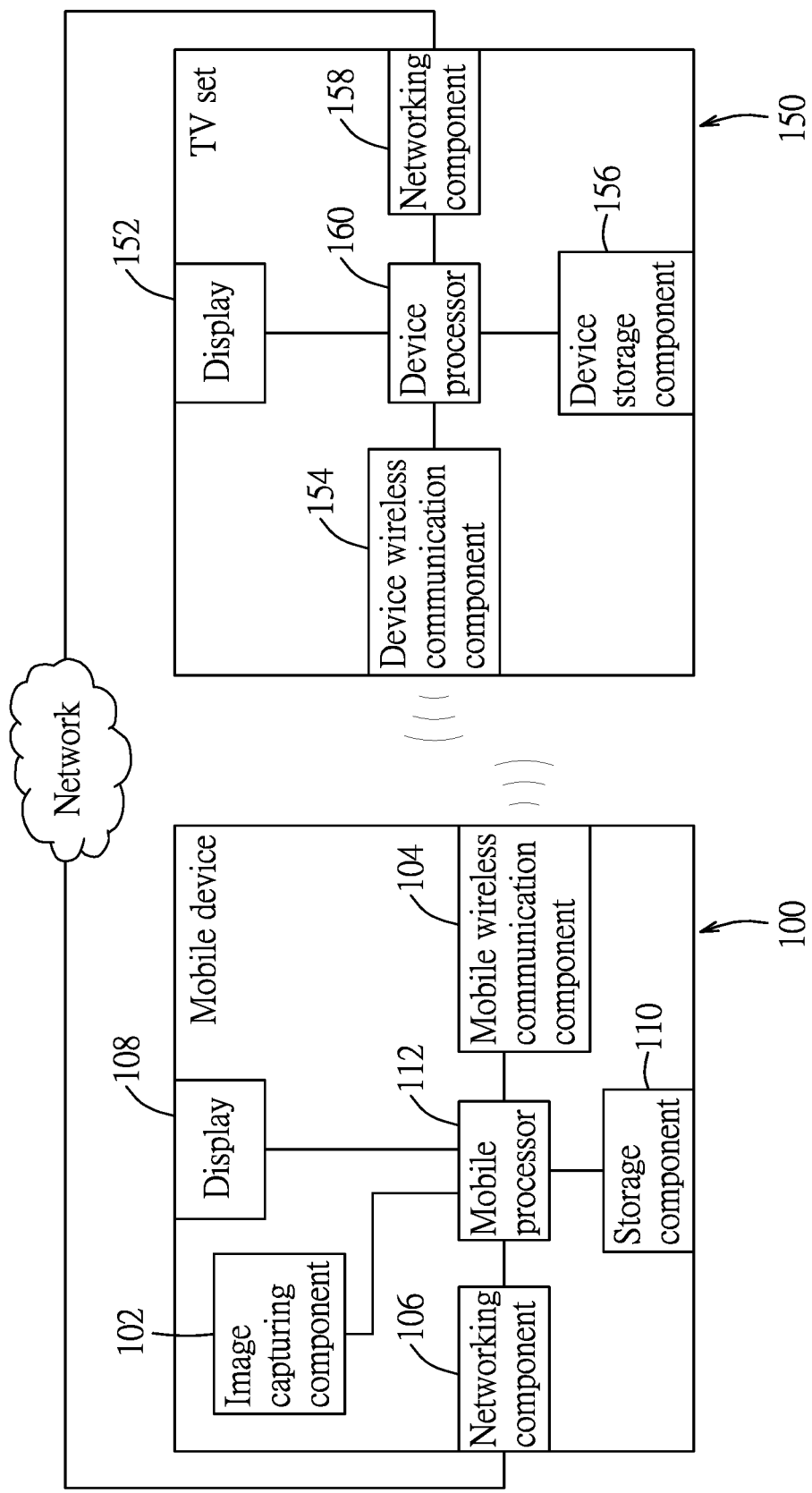
FIG. 1B is a block diagram illustrating the components of the electronic system of FIG. 1A.

Further referring to FIG. 1B, the mobile electronic device 100 may be embodied using a smart phone, a tablet, or a laptop, etc., and includes an image capturing component 102, a mobile wireless communication component 104, a networking component 106, a display 108, a storage component 110 and a mobile processor 112.

The image capturing component 102 may be embodied using a camera built in the mobile electronic device 100. The mobile wireless communication component 104 is capable of establishing wireless communication with another electronic device within a short distance, using techniques such as near-field communication (NFC), Bluetooth®, Wi-Fi peer-to-peer (P2P), Wi-Fi hotspot, etc., for data transmission.

The networking component 106 is capable of accessing a network (e.g., a cellular network such as GSM, CDMA2000, EV-DO, HSPA+, LTE, etc.) in order to communicate with other electronic devices through the network.

The display 108 may be embodied using a touch screen built-in the mobile electronic device 100. The storage component 110 may be embodied using a physical data storage (e.g., a flash memory) built in the mobile electronic device 100, and stores software applications that are executable by the mobile processor 112.

The mobile processor 112 is coupled to the above-mentioned components of the mobile electronic device 100, and is capable of executing the software applications including instructions that, when executed, cause the mobile processor 112 to perform certain operations.

The target electronic device 150 in this embodiment is a television (TV) set, and includes a display 152, a device wireless communication component 154, a device storage component 156, a networking component 158 and a device processor 160.

The device wireless communication component 154 is capable of communicating with the mobile wireless communication component 104 of the mobile electronic device 100 for data transmission therebetween.

The device storage component 156 includes at least one software program installed in the target electronic device 150. The software program may be an operating system (OS) or other applications providing the target electronic device 150 with various functionalities.

The networking component 158 may be built in the target electronic device 150 or may be externally connected to the target electronic device 150, and is capable of accessing a network (e.g., the Internet) using wireless or wired communication. The device processor 160 is electrically connected to the display 152, the device wireless communication component 154, the device storage component 156 and the networking component 158.

Figure 2:
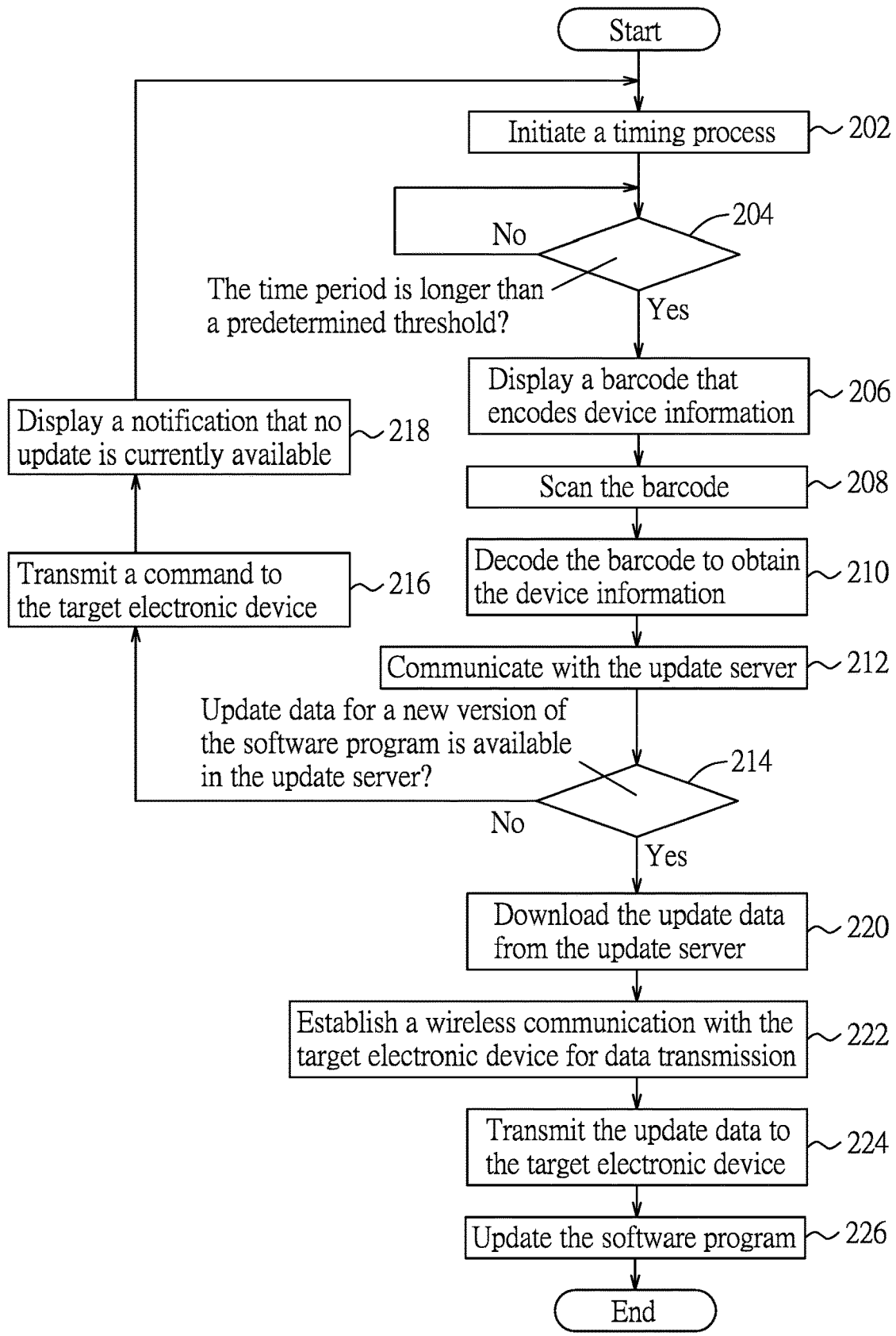
FIG. 2 is a flow chart illustrating steps of a method for updating a software program installed in a target electronic device of the electronic system according to one embodiment of the disclosure.

FIG. 2 is a flow chart illustrating steps of a method for updating a software program installed in the target electronic device 150 using the mobile electronic device 100, according to one embodiment of the disclosure.

In the method of this embodiment, the device processor 160 may first determine whether the networking component 158 is connected to a network, such as the Internet, via a cable or wirelessly via a Wi-Fi access point (AP). When it is determined that the target electronic device 150 is connected to a network (i.e., the target electronic device 150 is "online"), the device processor 160 may control the networking component 158 to communicate with an update server 190 (see FIG. 1) that stores and provides the software program, so as to determine whether a new version of the software program is available in the update server 190. When it is determined that a new version of the software program is available in the update server 190, the device processor 160 downloads update data for the new version of the software program from the update server 190 through the networking component 158, and updates the software program to the new version using the update data downloaded from the update server 190.

When it is determined that the networking component 158 is not activated or not connected to a network (i.e., the target electronic device 150 is "offline"), in step 202, the device processor 160 may initiate a timing process, in which the device processor 160 times a time period during which the target electronic device 150 is not connected to a network (e.g., the Internet).

In step 204, the device processor 160 determines whether the time period is longer than a predetermined threshold. Since it is likely that at least one update version for the software program has become available over two or three months, the predetermined threshold may be two or three months. In some embodiments, the predetermined threshold may be set and adjusted by a user. In the event that the target electronic device 150 becomes online, the timing is stopped, and restarts to time the time period from zero when the target electronic device 150 becomes off line again, repeating step 202.

When it is determined that the time period is longer than the predetermined threshold, the flow proceeds to step 206, in which the device processor 160 controls the display 152 to display a barcode that encodes device information associated with the target electronic device 150. In this embodiment, the barcode may be in the form of a quick response (QR) code.

In use, after it is determined that the time period is longer than the predetermined threshold, the device processor 160 may control the display 152 to display a message that includes text content for notifying the user that the software program installed in the target electronic device 150 has not been updated for longer than the predetermined threshold and for instructing the user to choose to connect the target electronic device 150 to a network (e.g., the Internet) for performing update, or to select an "offline update" procedure that can be done cooperatively with the mobile electronic device 100 without connecting the target electronic device 150 to a network when the target electronic device 150 is powered on. In the case that the offline update procedure is selected, the barcode is then displayed. For example, the user may select the offline update procedure by operating a remote control of the target electronic device 150. Alternatively, the message may be displayed simultaneously with the barcode, and the user may select the off line update procedure by using the mobile electronic device 100 to scan the barcode.

The device information to be encoded in the barcode includes at least a version number of the software program installed in the target electronic device 150. Additional information regarding the target electronic device 150 may be selectively incorporated in the device information encoded in the barcode, such as one or more of, a 64-bit Extended Unique Identifier (EUI-64) of the target electronic device 150, a model type or a model number of the target electronic device 150, a language setting for the target electronic device 150, a country in which the target electronic device 150 is marketed, a region code indicating a region where the target electronic device 150 is marketed, a serial number of the target electronic device 150, and a Wi-Fi hotspot name for connecting with the target electronic device 150.

It is noted that since all of the above information is static data already stored in the target electronic device 150, the generation of the barcode may be implemented solely by the device processor 160 of the target electronic device 150 without having to communicate with other devices such as the update server 190.

In step 208, the user operates the mobile electronic device 100 to scan the barcode using the image capturing component 102. In use, the user may execute an application dedicated for performing the offline update procedure, and the mobile processor 112 in turn activates the image capturing component 102, and after the user aligns the image capturing component 102 with the barcode, the barcode may be scanned by the image capturing component 102.

Afterward, in step 210, the mobile processor 112 decodes the barcode to obtain the device information.

Then, the mobile processor 112 controls the networking component 106 to communicate with the update server 190 in step 212, so as to determine, according to the device information (particularly, the version number of the software program), whether update data for a new version of the software program is available in the update server 190 in step 214. In particular, the mobile processor 112 determines whether update data for a new version of the software program is available in the update server 190 by comparing the version number decoded from the barcode with a version number of the software program stored in the update server 190. In some embodiments, the mobile processor 112 may transmit the version number thus decoded to the update sever 190 through the networking component 106, so that the update server 190 may compare the version number received from the mobile electronic device 100 with the version number of the software program stored therein and transmit a comparison result to the mobile electronic device 100. In some embodiments, other parts of the device information may be taken into consideration. For example, when the model type is considered, the mobile processor 112 may further determine whether a new version of the software program that is compatible with the model type of the target electronic device 150 as specified in the device information is available. When the language setting (e.g., Mandarin Chinese) of the target electronic device 150 is considered, the mobile processor 112 may further determine whether a new version of the software program that supports the specific language is available.

When no update data for a new version of the software program is available from the update server 190, the mobile processor 112 may control the mobile wireless communication component 104 to communicate with the device wireless communication component 154, so as to transmit a command to the target electronic device 150 (step 216) and the target electronic device 150 displays a notification that no update is currently available on the display 152 in response to receipt of the command (step 218). Afterward, the device processor 160 of the target electronic device 150 terminates the current procedure and restarts timing of the time period (i.e., return to step 202).

On the other hand, when it is determined that update data for a new version of the software program is available from the update server 190, the flow proceeds to step 220, in which the mobile processor 112 controls the networking component 106 to communicate with the update server 190 through the Internet and to download the update data from the update server 190.

Afterward, the flow proceeds to step 222, in which the mobile processor 112 establishes wireless communication with the target electronic device 150 for data transmission therebetween. Specifically, the mobile processor 112 controls the mobile wireless communication component 104 to communicate with the device wireless communication component 154 of the target electronic device 150 using short range wireless communication. For example, the wireless communication may be established using one of Bluetooth®, Wi-Fi peer-to-peer (P2P), Wi-Fi hotspot, and Near Field Communication (NFC).

In one embodiment, the mobile processor 112 may establish the wireless communication with the target electronic device 150 by first pairing with the target electronic device 150 using the device information decoded from the barcode. Subsequently, when the mobile electronic device 100 is successfully paired with the target electronic device 150, the mobile processor 112 establishes the wireless communication with the target electronic device 150.

In some embodiments, after the downloading, the mobile processor 112 may perform a data integrity check (e.g., using MD5 algorithm) to determine whether the update data is completely downloaded, and step 222 is implemented after it is determined that the update data is completely downloaded. Otherwise, the mobile processor 112 may repeat the downloading and the data integrity check.

Afterward, in step 224, the mobile processor 112 controls the mobile wireless communication component 104 to transmit the update data to the target electronic device 150 through the wireless communication. As such, after the update data is transmitted to the target electronic device 150, in step 226, the device processor 160 of the target electronic device 150 updates the software program to the new version using the update data received from the mobile electronic device 100.

After the update of the software program is completed, the method is terminated. In some embodiments, the method is repeated and the device processor 160 restarts timing of the time period (i.e., return to step 202) after the update of the software program is completed.

To sum up, the method and electronic system as described above provide a way for the target electronic device 150 to update a software program installed therein without having to itself connect to a network such as the Internet. This may be particularly useful when the target electronic device 150 is, for example, a TV set, which may not have a built-in networking component.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for updating a software program installed in a target electronic device using a mobile electronic device, the method comprising:
    measuring, by the target electronic device, a time period during which the target electronic device is not connected to a network;
    when the measured time period is longer than a predetermined threshold amount of time, displaying, by the target electronic device, a barcode that encodes device information associated with the target electronic device, the device information including at least a version number of the software program installed in the target electronic device;
    scanning, by the mobile electronic device, the barcode displayed on the target electronic device;
    decoding, by the mobile electronic device, the barcode so as to obtain the device information encoded in the barcode;
    communicating, by the mobile electronic device, with an update server so as to determine, according to the version number of the software program, whether update data for a new version of the software program is available in the update server;
    when it is determined that the update data is available, downloading, by the mobile electronic device, the update data from the update server;
    establishing, by the mobile electronic device, wireless communication with the target electronic device for data transmission;
    transmitting, by the mobile electronic device, the update data to the target electronic device through the wireless communication; and
    updating, by the target electronic device, the software program installed therein to the new version using the update data received from the mobile electronic device.

2. The method of claim 1, further comprising:
    determining, by the mobile electronic device, whether the update data is completely downloaded; and
    when it is determined that the update data is completely downloaded, establishing, by the mobile electronic device, wireless communication with the target electronic device.

3. The method of claim 1, wherein the establishing of wireless communication with the target electronic device includes:
    pairing with the target electronic device using the device information decoded from the barcode, and
    establishing the wireless communication with the target electronic device when the mobile electronic device is successfully paired with the target electronic device.

4. The method of claim 1, further comprising a step of displaying a message that instructs a user to update the software program using the mobile electronic device.

5. The method of claim 1, wherein the device information encoded in the barcode is static data stored in the target electronic device itself.

6. The method of claim 5, wherein the device information further includes at least one of the following:
    a 64-bit Extended Unique Identifier (EUI-64) of the target electronic device;
    a type of the target electronic device;
    a language setting for the target electronic device;
    a country in which the target electronic device is marketed;
    a region code indicating a region where the target electronic device is marketed;
    a serial number of target electronic device; and
    a Wi-Fi hotspot name for connecting with the target electronic device.

7. The method of claim 1, wherein the wireless communication is established using one of Bluetooth®, Wi-Fi peer-to-peer (P2P), Wi-Fi hotspot, and Near Field Communication (NFC).

8. The method of claim 1, wherein the target electronic device is a television set.

9. An electronic system comprising:
    a target electronic device installed with a software program, the target electronic device including:
        a display,
        a device wireless communication component, and
        a device processor electrically connected to said display and said device wireless communication component, and programmed to measure a time period during which said target electronic device is not connected to the network and, when the measured time period is longer than a predetermined threshold, control said display to display a barcode that encodes device information associated with said target electronic device, the device information including at least a version number of the software program installed in said target electronic device; and
    a mobile electronic device, the mobile electronic device including:
        an image capturing component for scanning the barcode displayed on said display of said target electronic device,
        a mobile wireless communication component for communicating with said device wireless communication component for data transmission,
        a networking component for communicating with an update server through a network, and
        a mobile processor programmed to:
            decode the barcode scanned by said image capturing component so as to obtain the device information encoded in the barcode,
            control said networking component to communicate with the update server so as to determine, according to the version number of the software program, whether update data for a new version of the software program is available in the update server,
            when it is determined that the update data is available, download the update data from the update server through said networking component, control said mobile wireless communication component to establish wireless communication with said device wireless communication component of said target electronic device, and transmit the update data to said target electronic device through the wireless communication so as to enable said device processor to update the software program to the new version using the update data received from said mobile electronic device.

10. The electronic system of claim 9, wherein said mobile processor is further programmed to:

determine whether the update data is completely downloaded; and control said mobile wireless communication component to establish the wireless communication with said device wireless communication component when it is determined that the update data is completely downloaded.

11. The electronic system of claim 9, wherein the device information further includes at least one of the following:

a 64-bit Extended Unique Identifier (EUI-64) of said target electronic device;

a type of said target electronic device;

a language setting for said target electronic device;

a country in which said target electronic device is marketed;

a region code indicating a region where the target electronic device is marketed;

a serial number of said target electronic device; and a Wi-Fi hotspot name for connecting with said target electronic device.

12. The electronic system of claim 9, wherein the wireless communication is established using one of Bluetooth®, Wi-Fi peer-to-peer (P2P), Wi-Fi hotspot, and Near Field Communication (NFC).

13. The electronic system of claim 9, wherein said target electronic device is a television set.

* * * * *